June 23, 1970  T. O. LANG ET AL  3,516,123
INJECTION MOLDING MACHINE
Filed Oct. 3, 1966  2 Sheets-Sheet 1
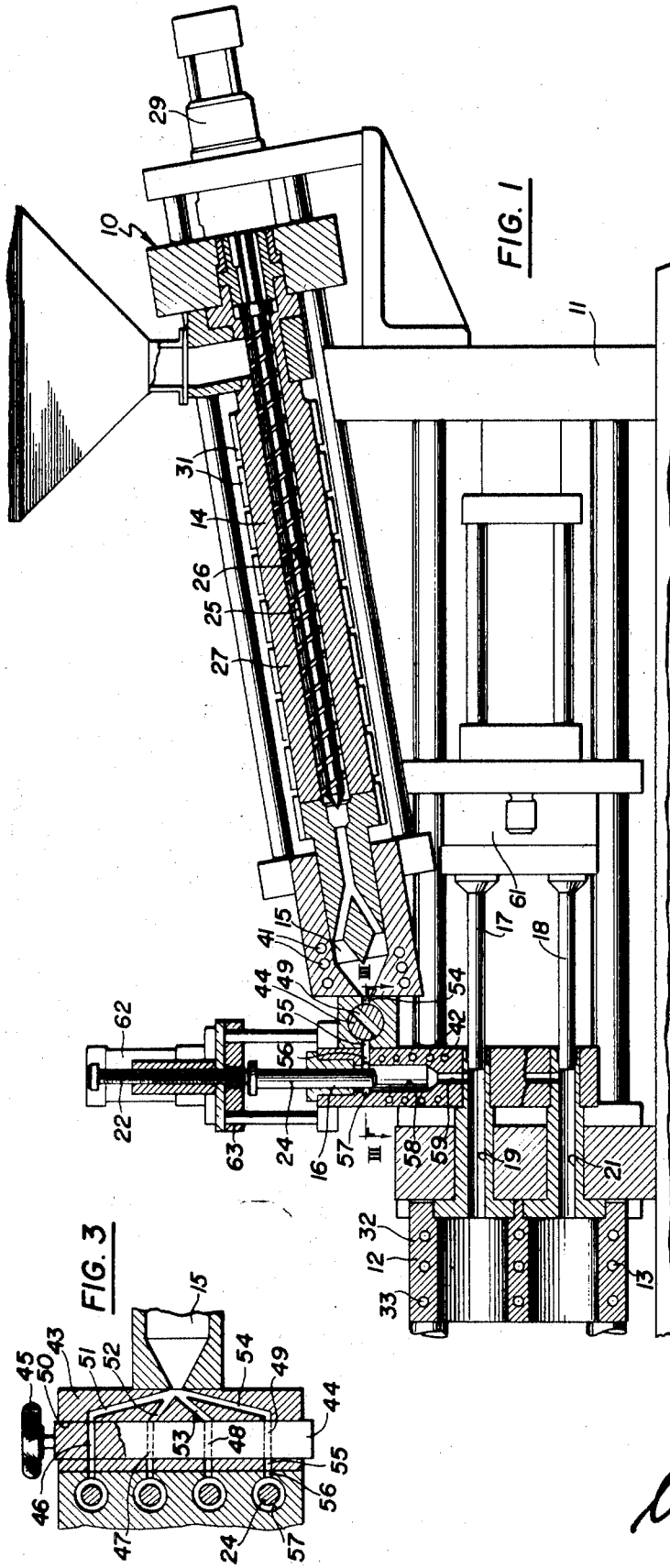
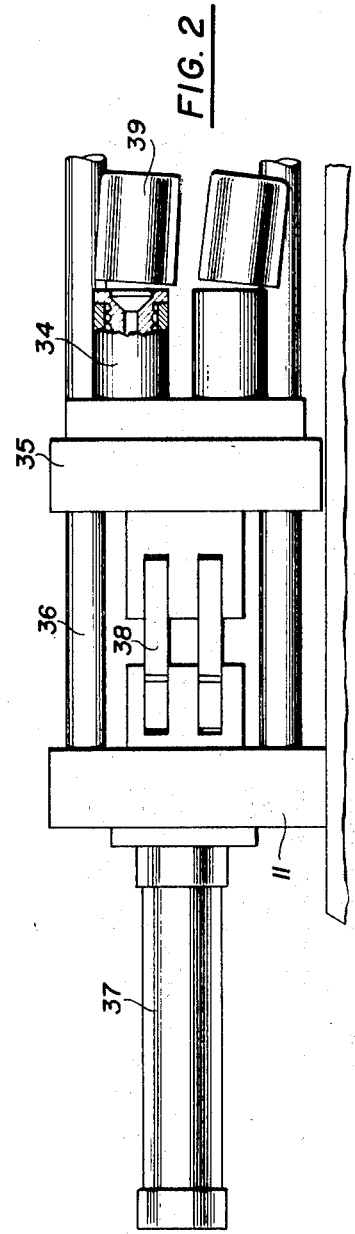
THEO O. LANG
GEORGE F. QUIST
INVENTORS
BY
Gerard Blodgett

THEO O. LANG
GEORGE F. QUIST
INVENTORS

United States Patent Office 3,516,123
Patented June 23, 1970

3,516,123
INJECTION MOLDING MACHINE
Theo O. Lang, 42 Pleasant Terrace, Leominster, Mass. 01453, and George F. Quist, 120 Worcester St., West Boylston, Mass. 01583
Filed Oct. 3, 1966, Ser. No. 583,524
Int. Cl. B29f 1/04
U.S. Cl. 18—30                                    11 Claims

ABSTRACT OF THE DISCLOSURE

This disclosure relates to an injection molding machine for producing thin-walled containers and the like through the use of high impact energy and having individual metering apparatus associated with each of a plurality of cavities.

---

Figure 4:
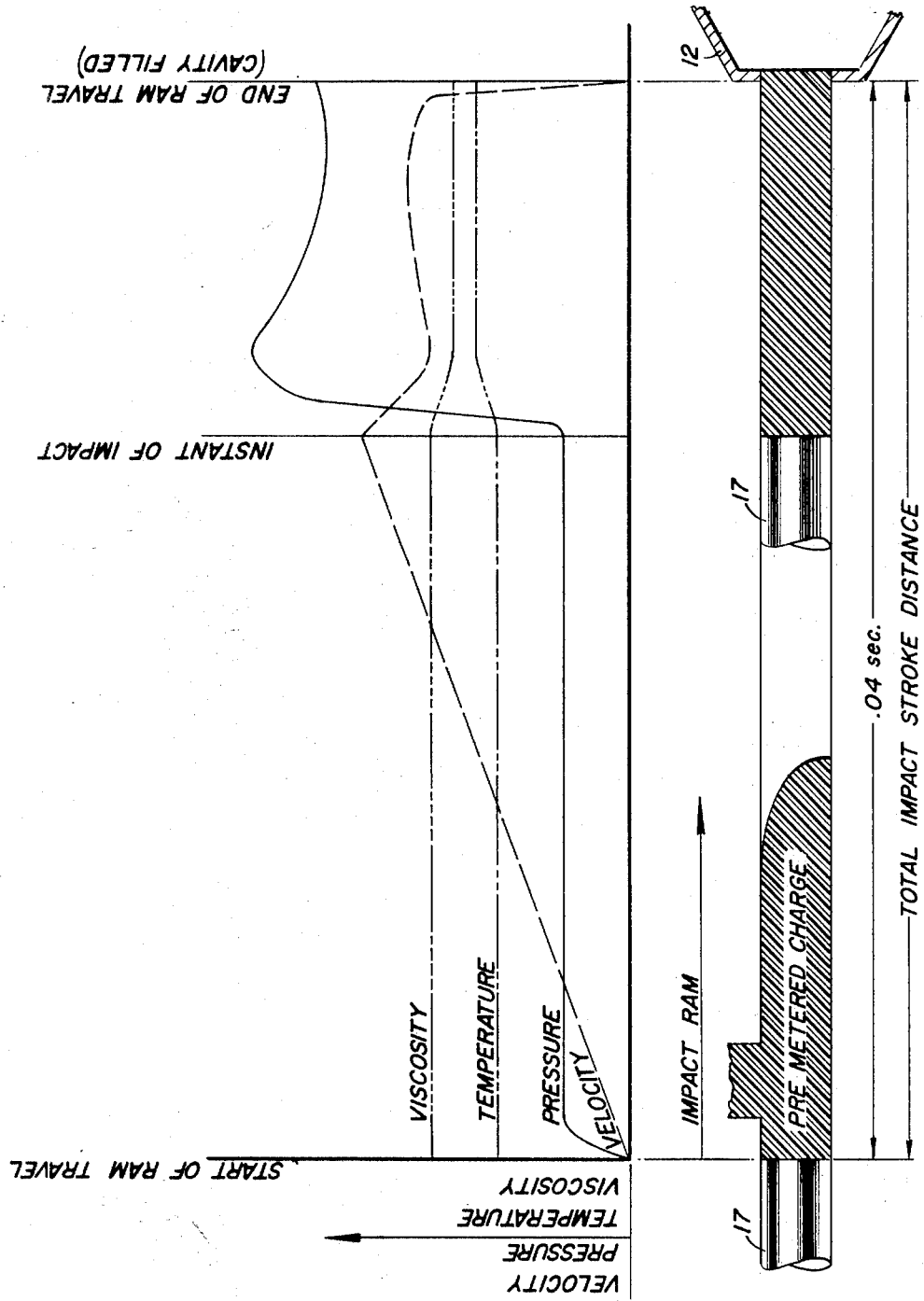

This invention relates to an injection molding machine and, more particularly, to apparatus for producing thin-walled containers and the like through the use of high impact energy.

It has been common practice in the past to form containers and the like from plastic and, for this purpose, extensive use has been made of the techniques of injection molding, blow molding, vacuum forming, and rotary molding.

Attempts to produce thin wall containers by injection molding, those having a wall thickness of less than .024/.028 inch, have resulted in failure. These containers are relatively small (6 to 12 oz. capacity). Minimum wall thickness of larger volume containers would increase in proportion to the total surface area. Present injection molding techniques involve restrictive sprues, runners and gates, and relatively slow injection ram speed, which prevent the filling of thin wall cavities as mentioned above. Also, to maintain a flow of the heated plastic material during the injection cycle, warm molds are utilized, which in turn extends the cooling time of the molded container.

Production of containers with the above-mentioned gage have been satisfactorily produced in single cavity molds, if one is very careful, but attempts to run multiple cavities with thin walls for achieving high production rates have failed.

In the process of thermo-forming, containers can be produced with wall thickness below that obtainable by present injection molding techniques. However, thermoformed containers cannot be produced with accurately-controlled wall thickness and with placement of material as desired. A common deficiency of the thermo-formed containers is weak, thin corners in relation to side walls and bottom. In order to obtain a container of adequate corner strength, material must be added throughout—which leads inadvertently to excess material in the walls.

Inasmuch as the thermo-formed containers are cooled by contact with the cavity on one side only, large multiples of cavities are required for high protection rates.

Blow molding, in essence, has all the deficiencies mentioned in thermo-forming. Also, blow-molded containers have an additional excess material in the pinch off area.

These and other difficulties experienced with the prior art devices have been obviated in a novel manner by the present invention.

It is, therefore, an outstanding object of the invention to provide an injection molding machine capable of giving high production of thin-walled containers and the like.

Another object of this invention is the provision of an injection molding machine capable of rapid cycles with multiple-cavity machines while maintaining accuracy of flow of material to each cavity.

A further object of the present invention is the provision of an injection molding machine using multiple cavities in which the amount of plastic introduced into each cavity can be adjusted very accurately.

It is another object of the instant invention to provide an injection molding machine which is capable of high production, which is simple and inexpensive to manufacture, and which is capable of a long life of useful service with a minimum of maintenance.

It is a further object of the invention to provide an injection molding machine for use in producing containers having wall thicknesses of less than .030" without over- or under-filling.

It is a still further object of the invention to provide a high production injection molding machine for producing containers having wall thicknesses in the range from .030" to lower limits not practical on existing machines.

Further objects of this invention is the provision of apparatus for producing thin wall containers and the like with controlled wall thickness at rapid cycle rates, to produce a less expensive product than is possible by existing methods, and the provision of a molding machine for producing thin wall containers permitting the use of high impact energy to inject the heated plastic into the cavity at high velocities, making use of well cooled cavities and cores, permitting very rapid cooling of the thin walled container, and using multiple cavities in which the amount of plastic introduced into each cavity can be adjusted very accurately by means of individual metering apparatus.

A further object of this invention is the provision of a molding machine capable of running multiple cavities by impacting the material and the use of individual metering apparatus.

An outstanding object of this invention is the provision of a molding machine capable of molding containers with controlled thin walls and the placement of material as desired in a manner impossible by the use of existing methods.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is a vertical sectional view of an injection molding machine embodying the principles of the present invention, FIG. 2 is a front elevation with portions broken away of a portion of the machine, FIG. 3 is a horizontal sectional view of the invention taken on the line III—III of FIG. 1, and FIG. 4 is a graphical representation of the injection cycle.

In general, the invention consists of an injection molding machine having a feeder for preparing the molten plastic material, having an accumulation chamber which is connected to the feeder and receives the molten plastic therefrom, and having individual metering apparatus associated with each mold cavity. Each such apparatus is connected to the accumulation chambers to receive the molten plastic therefrom. A ram is associated with each mold cavity to receive molten plastic from the respective metering apparatus and to cause it to flow into the respective mold cavity at high pressure and velocity.

In this present invention, it is proposed to provide a molding machine for the production of controlled thin wall containers and the like by improved methods over the present art; particularly injection molding. This method provides for the displacement of a pre-measured charge of plastic material exactly sufficient to fill a cavity by impact energy exerted by a ram directly into the mold cavity. During the instant of the impact on the pre-measured charge of plastic material entering the cavity, part of the impact energy is converted into heat. The additional heat instantaneously lowers the viscosity of the plastic material giving it improved flow characteristics. The remaining impact energy is used to inject this momentarily, super heated, low viscosity material into the cavity at extremely high velocity creating a more dense and uniform product. This instantaneous additional heat is not of a duration long enough to affect decomposition of the plastic material. The extremely high impact velocity, and the additional imparted heat prevents heat loss during the injection time and permits filling cold molds for producing controlled thin wall containers, both temperature of the mold and wall thickness of molded item being well below the lower limit possible by the present art of injection molding.

The above-mentioned impact energy is exerted by a ram. The impact ram, having displaced the pre-measured charge of plastic material into the cavity, becomes then a part of the cavity. As a matter of fact, this last position is such that the end radial surface of the ram is coplanar with the bottom surface of the mold cavity, so that no flaw appears on the molded article. To insure complete cooling of the molded article, the end radial surface impact ram will be cooled to a degree similar to the mold itself. This cooling will also prevent the adhesion of any plastic material to the face of the ram. The pre-measured charge mentioned above originates from a plasticizing unit which displaces material into a metering chamber having means for very accurate adjustment of the volume therein, which coincides with the requirements of the individual cavity. It is evident that this metering device serves a dual purpose; that is, providing an accurately measured charge and transfers that charge to the impact chamber. When a multiple of cavities are used, each cavity will have its own impact ram and its own individually adjustable transfer metering device. By utilization of this metering system, it is now possible to run multiple cavities without over- and under-filling, as experienced in the present art of injection molding.

Referring first to FIG. 1, wherein are best shown the general features of the invention, the injection molding machine, indicated generally by the reference numeral 10, is shown as having a main body 11 provided with a plurality of mold cavities 12 and 13. A feeder 14 is provided for preparing molten plastic material and introducing it into an accumulation chamber 15 which is connected to the feeder to receive the molten plastic therefrom.

Individual metering apparatus is associated with each mold cavity. For instance, the metering apparatus 16 is associated with the mold 12. Although the description describes and shows only two mold cavities 12 and 13, it will be understood that in a commercial machine there will be as many as four cavities and, for that purpose, four cavities are described in connection with the present machine. Each individual metering apparatus is connected to the accumulation chamber 15 to receive molten plastic therefrom. A ram 17 is associated with the mold cavity 12, while a similar ram 18 is associated with the mold cavity 13. Each ram receives molten plastic from its respective metering apparatus in the same manner that the ram 17 receives plastic from the metering apparatus 16 and causes it to flow into its respective mold cavity at high pressure and velocity.

The mold cavity 12 is formed to provide a thin-walled article, that is to say, one having a wall thickness in the range of 0.25″ or less. A large open passage 19 extends between the ram 17 and the mold cavity 12 and a similar open passage 21 extends between the ram 18 and the mold cavity 13. The metering apparatus 16 is individually adjustable in its capacity to compensate for variation of the mold cavities and to provide for the flow of an exact amount of plastic into the mold cavity 12. For that purpose, the metering apparatus 16 is provided with a screw stop 22 which is mounted on a super-structure 23 overlying a piston 24 forming part of the metering apparatus 16. The screw permits the adjustment of the length of stroke of the piston 24.

The feeder 14 comprises a screw 25 which operates in a bore 26 in a body 27. The bore is inclined toward the accumulation chamber 15 and at its upper end is connected to a hopper 28, while the other end is connected through an extrusion nozzle to the accumulation chamber 15. The feeder 14 is capable of movement longitudinally and is provided at its upper, outboard end with a linear actuator, such as a hydraulic cylinder 29 which brings about such longitudinal motion or resists it, on occasion.

The feeder 14 is provided with an electrical heating means 31 which is used for raising the temperature of the plastic introduced from the hopper. The mold cavity 12, which is similar to the other mold cavities in the machine, is formed in two parts. A female portion 32 is fixed to the main body 11 and is provided with temperature-regulating passages 33 through which liquid flows in order to maintain the temperature of the plastic at a pre-determined constant value. A male portion 34 (see FIG. 2) cooperates with the female portion to provide the mold cavity.

Referring to FIG. 2, it can be seen that the male portion 34 is carried by a slide 35 which is movable along suitable horizontal rods 36 forming part of the main body 11. A linear actuator, such as a hydraulic cylinder 37, operates through a conventional toggle mechanism 38 to introduce the male portion 34 into the female portion 32 to form the mold cavity 12, on occasion. In FIG. 2, the completed article 39 is shown as falling out of the mold; for the purpose of description, it is shown as a thin-walled, open-ended container. Passages 41 are associated with the metering apparatus 16 to maintain the molten plastic at a pre-determined temperature.

Referring to FIG. 3, it can be seen that the accumulation chamber 15 is connected to a manifold 43 having a bore 50 extending lengthwise thereof and transversely of the axis of the screw 25. In the bore 50 is mounted a cylindrical valve body 44 rotatable by means of a handle 45. It should be understood that the rotation of this valve body would take place in an automatic machine by means of a linear actuator and ratchet mechanism to rotate the valve to various positions during the machine cycle. The valve body is provided with passages 46, 47, 48, and 49. Extending from the connection at the end of the accumulation chamber 15 to the bore 50 are four passages 51, 52, 53, and 54 which connect to the bore 50 in the vicinity of the passages 46, 47, 48, and 49, in the valve body 44. Extending through the manifold 43 are four passages associated with the other sets of four passages in the valve body and in the manifold; for instance, a passage 55 lies in the vicinity of the passages 54 and 49 and extends into a short passage 56 in the body of the metering apparatus 16 and connects to an annular groove 57 surrounding the piston 24. Similar passages are arranged to connect the various passages in the manifold and valve to the other three metering apparatus. As is evident in FIG. 1, the annular groove 57 leads into a smaller diameter vertical bore 58 in which the piston 24 resides. The bore diameter is larger than the piston diameter and the bottom of the bore 58 is connected by a narrow bore 59 to the large horizontal passage 19 leading to the mold cavity. The ram 17 is operated by a linear actuator, such as a hydraulic cylinder 61, and moves from a position rearwardly of the bore 59 to a forward position immediately adjacent the mold cavity. As a matter of fact, this last position is such that the end radial surface of the ram 17 is coplanar with the bottom surface of the mold cavity, so that no flaw appears on the molded article. The metering piston is located below the plate 63. The fixed super structure carries the stop screw 22. A hydraulic cylinder 62 moves the plate and piston vertically.

The operation of the apparatus will now be readily understood, in view of the above description. The controls are set up so that hydraulic fluid is available for all hydraulic cylinders 29, 61, and 37 and a control means is provided to introduce and remove fluid from these cylinders at the proper times to set up an operating cycle. Plastic pellets are fed into the hopper 28 and passed downwardly into the bore 26 where they are grasped by the screw 25 and transferred downwardly. At the same time that the plastic is transferred, it is heated by the heaters 31 and is plasticized in the usual way. The plasticized material enters the accumulation chamber 15 through the extruder nozzle forming part of the body 27 (which might also be designated an accumulator piston). The lower end of the body 27 fits tightly in the bore forming the accumulator chamber. As the plasticized material enters the accumulation chamber 15, its back pressure pushes the body 27 rearwardly against pressure in the hydraulic cylinder 29. This cylinder pressure can be regulated to regulate the back pressure, which is necessary for good plasticizing.

When the body 27 has been replaced by a pre-determined amount of plasticized material (which amount is adequate to fill subsequent mold cavities), the shut-off valve 44 is rotated so that the passage 49 is lined up with the manifold passages 54 and 55. Pressure is then applied to the cylinder 29 and the body 27 acts as a piston to push the plasticized material through the valve into the metering apparatus 16. At this stage of the proceedings, the ram 17 is in a forward or left-hand position and closes the bore 59 so that the chamber formed by the bore 58 becomes filled with plasticized material and the metering plunger or piston 16 is pushed upwardly until it strikes the bottom of the stop 22. In successive trial cycles, the amount of material in the metering chamber can be adjusted by adjusting the screw-type stop 22 until the correct amount of plastic is metered to fill the mold cavity properly.

Eventually, the cylinder 61 draws the ram 17 to the right and uncloses the bore 59. Before this is opened, however, the valve 44 is closed and pressure is applied to the hydraulic cylinder 62 which forms part of the metering apparatus 16 and which is connected to the movable plate 63 through which passes the stop screw 22. The downward movement of the plate 63 carries the piston 24 with it and discharges an exact amount of plasticized material into the passage 19. It should be noted that, while the cylinder 61 is retracting, the cylinder 37 at the other end of the machine is withdrawing the male portion 34 from the mold chamber cavity so that the article 39 can be removed. The cylinder 37 then replaces the male member 34 within the female member 32 so that the mold cavity 12 is closed again. The cylinder 61 is then operated and is driven forwardly rapidly carrying the material under high pressure and forcing it from the bore 19 into the mold cavity. While the material is curing in the cavity, the continuously operating screw 25 is plasticizing more material and filling the accumulator chamber 15 and is displacing the body 27 rearwardly ready for the next cycle.

It is clear that in operating through a cycle, when the ram 17 is in the forward or left-hand position and acts as a valve over the bore 59, the mold cavity is closed by the toggle mechanism 38. At this time, the screw 25 operates through its extruder nozzle to fill the accumulation cavity 15. Then, the mold opens and the ram 17 is retracted by the cylinder 61. As it retracts, the valve 44 is closed between the accumulator chamber 15 and the metering chamber bore 58. Hydraulic pressure is applied to the metering cylinder 62 so that, when the ram 17 clears the metering port or bore 59, the material is transferred into the impact chamber or bore 19. At the same time, as the mold opens to its extreme rear position, similar to that condition shown in FIG. 2, the article 39 is ejected. At this time, the impactor ram 17 now has cleared the metering port or bore 59 and the impact chamber or bore 19 is filled with metered plastic material. While the metering cylinder 62 and the piston 24 are bottoming out, suitable valves cause the actuating cylinder 37 to close the mold through the toggle mechanism 38. The closing of the mold operates through suitable limit switches to cause the cylinder 61 to bring the ram 17 to the left.

As the ram 17 moves to the left, closing the bore 59, the metering cylinder 62 is retracted and the valve 44 opens up, (thus permitting plasticized material to flow from the extruder and from the accumulation chamber under the impetus of the cylinder 29). The metering chamber bore 58 is filled in the amount required for molding the next part. The ram 17 continues its rapid, high-pressure forward stroke to carry the transferred charge through the bore 19 directly into the mold cavity 12. With the ram in the left-hand position, the part is cooled in the cavity by means of the passages 33 and by the face of the ram which has now become part of the cavity. This completes the cycle and the article is completely formed.

It can be seen, then, that this invention has to do with an apparatus for molding plastic materials into plastic cans or other open-ended containers with extremely thin walls, that is to say, .025″ and the like. It is also useful for forming relatively thin walls on large containers, wherein the walls are thin relative to the large surface area. Containers of the above-described type cannot be produced at a rapid rate by any one of the known processes of injection molding, thermo-forming, and blow molding.

On the other hand, the containers produced by injection molding have a controlled wall thickness. However, as pointed out above, containers with less than, say .028″ to .024″ wall thickness are very difficult to mold and practically impossible when it comes to multi-cavity machines. There are additional disadvantages because of the long cycle time due to warm molds and wall thicknesses. Furthermore, containers produced by thermo-forming or blow molding can be made with thin walls, but the gage is not controlled, so that such containers have more or less thin corners compared with the rest of the wall. Since the corner of the container needs a certain gage to prevent the container from collapsing, the walls necessarily carry excess material to permit maintaining a minimum material thickness on the corners. The present method combines all of the advantages of the above-mentioned methods and avoids their disadvantages. It is additionally important for economic reasons to mention that the present machine uses plastic material in its least expensive form; that is to say, in the form of pellets rather than in a pre-finished form, such as rods, tubes, sheets, or films. The present apparatus allows very short cycles and very high production rates for the reasons which are obvious from the above description of the invention and its operation. Among the advantages is the provision of a large gate, so that there is no sprue. The large gate or passage entering the mold permits the impacting of materials into a cavity without restrictions that are found in conventional injection molding techniques. This is partly due to the fact that very accurate metering is provided for each mold, so that the exact proper amount of plastic can be rammed into the mold without the problem of over-fill or under-fill. The end of the ram 17 becomes flush with the bottom of the surface forming the bottom of the container and there is no flaw in the finished container.

Another advantage involves the displacement of the plastic material by the impact method. During the instant of impact, part of the impact energy is converted into heat. The additional heat gives the plastic material an improved flow characteristic, but the additional heat, which can be considerable in high viscosity materials, does not act long enough on the material to effect a decomposition. This momentarily-superheated, low-viscosity material is then impacted into the cavity with very high velocity to create a more dense and uniform product. The provision of high impact in the molding process not only provides high impact but also high velocity, high pressure, and high energy release. It imparts additional heat, gives better flow while the high velocity permits no heat loss during the filling of the cavity, thus there is less friction on the core and cavity walls, and the filling of extremely thin walls is possible with very little stress.

The advantages of the high impact molding technique taught by the present invention can be best understood by referring to the graph shown in FIG. 4. As the ram 17 moves toward the mold cavity, it pushes the measured charge of molten plastic ahead of it. The pressure, temperature, and viscosity of the charge remain substantially constant during this period. Eventually, however, the charge reaches the mold cavity with its restricted passages. Because of the speed of the ram, the charge is compressed between the ram and the mold, so that the pressure goes up very quickly. This, in turn, sends the temperature up and the viscosity down. The less-viscous charge then flows easily into the cavity where it is quickly cooled. The rise and drop of the temperature takes place in so short a length of time that no deterioration of the plastic takes place, although decomposition would take place, if the uplastic were maintained at such a high temperature for any appreciable length of time.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An injection molding machine, comprising
(a) a main body having a plurality of mold cavities,
(b) a feeder for preparing molten plastic material,
(c) an accumulation chamber connected to the feeder to receive the molten plastic therefrom,
(d) an individual metering apparatus associated with each mold cavity, each such apparatus being connected to the accumulation chamber to receive molten plastic therefrom, and
(e) a ram associated with each mold cavity receiving molten plastic from the respective metering apparatus and causing it to flow into the respective mold cavity at high pressure and velocity.

2. An injection molding machine as recited in claim 1, wherein the mold cavity is formed to produce a thin-walled article.

3. An injection molding machine as recited in claim 1, wherein a large, open passage extends between the ram and its respective mold cavity.

4. An injection molding machine as recited in claim 1, wherein each metering apparatus is individually adjustable in its capacity to compensate for variation of its respective mold cavity from a standard.

5. An injection molding machine as recited in claim 4, wherein the metering apparatus is provided with a screw for adjusting the length of stroke of a piston forming an operating element thereof.

6. An injection molding machine as recited in claim 1, wherein the feeder comprises a screw rotating in a bore, one end of the bore being connected to a hopper and the other end being connected to the accumulation chamber, the feeder being capable of movement longitudinally and being provided with a linear actuator for bringing about the said movement.

7. An injection molding machine as recited in claim 6, wherein the feeder is provided with heating means for raising the temperature of plastic introduced from the hopper to the molten state.

8. An injection molding machine as recited in claim 1, wherein each mold cavity is formed by two mold halves, one half being fixed relative to the ram and the other half being movable under the impetus of a linear actuator from a closed position in cooperation with the other half to an open position at which a finished article can be removed.

9. An injection molding machine as recited in claim 1, wherein heating means is provided in association with the accumulation chamber and the metering apparatus to maintain the molten plastic at a predetermined temperature.

10. In an injection molding machine for high-pressure, high-production-rate molding of thin-walled containers, said machine being of the type having mold means with a plurality of cavities, a single molten plastic supply means for feeding to said cavities and ram means associated with said mold means for forcing molten plastic thereinto, the combination of individual metering means connecting each said cavity with said molten plastic supply means for metering identical charges into each said cavity, the ram means comprising a plurality of individual ram chambers and rams, each ram chamber connecting one said cavity to one said metering means to form identical charges identically impacted by said rams to flow into said cavities.

11. In an injection molding machine for high-pressure, high-production-rate molding of thin-walled containers, said machine being of the type having mold means with a plurality of cavities, a single molten plastic supply means for feeding to said cavities and ram means associated with said mold means for forcing molten plastic thereinto, the combination of individual metering means connecting each said cavity with said molten plastic supply means for metering identical charges into each said cavity, said ram means including a plurality of individual ram chambers with rams reciprocable therein, each ram chamber being of greater volume than the charge metered thereinto and each ram being normally poised at a spaced distance from said charge to permit said ram to accelerate to high velocity before engaging said charge, and linear actuator means on said machine for accelerating said rams at high velocity to impact said charges, force the same into said cavities against resistance while increasing the temperature and reducing the viscosity of said charges thereby densifying the molded products.

References Cited

UNITED STATES PATENTS

| | | | |
|---|---|---|---|
| 2,359,840 | 10/1944 | Goessling | 18—30 |
| 2,912,719 | 11/1959 | Gilmore et al. | 18—30 |
| 3,001,234 | 9/1961 | Renier | 18—30 |
| 3,117,348 | 1/1964 | Rees | 18—30 |
| 3,191,233 | 6/1965 | Linderoth | 18—30 |
| 3,253,303 | 5/1966 | Bradt | 18—30 |
| 3,296,353 | 1/1967 | Nouel | 18—30 |
| 3,299,475 | 1/1967 | Carlson et al. | 18—30 |
| 3,253,303 | 5/1966 | Bradt | 18—30 |
| 3,417,433 | 12/1968 | Teraoka | 18—30 |

FOREIGN PATENTS

| | | |
|---|---|---|
| 474,590 | 9/1952 | Italy. |
| 1,169,524 | 12/1958 | France. |
| 767,164 | 1/1957 | Great Britain. |

WILBUR L. McBAY, Primary Examiner

U.S. Cl. X.R.

264—329